J. W. Myers.
Earth Excavator.

No. 108,723.  Patented Oct. 25, 1870.

Witnesses:
F. W. Sansom
Wm. H. Gibbs

Inventor:
John W. Myers

United States Patent Office.

JOHN W. MYERS, OF LYONS, IOWA.

Letters Patent No. 108,723, dated October 25, 1870.

IMPROVEMENT IN EARTH-EXCAVATORS.

The Schedule referred to in these Letters Patent and making part of the same

---

I, JOHN W. MYERS, of Lyons, Clinton county, State of Iowa, have invented certain improvements in Earth-Excavators, of which the following is a specification.

My invention relates to a novel combination of levers with the plunger of a hollow or tubular spade or excavator, for digging post-holes, &c., the object of my invention being to facilitate the discharge of earth from the instrument.

Description of the Accompanying Drawing.

Figure 1:
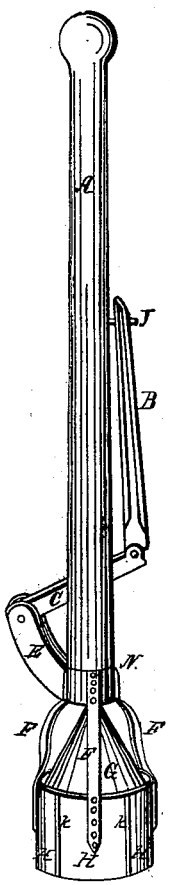
Figure 2:
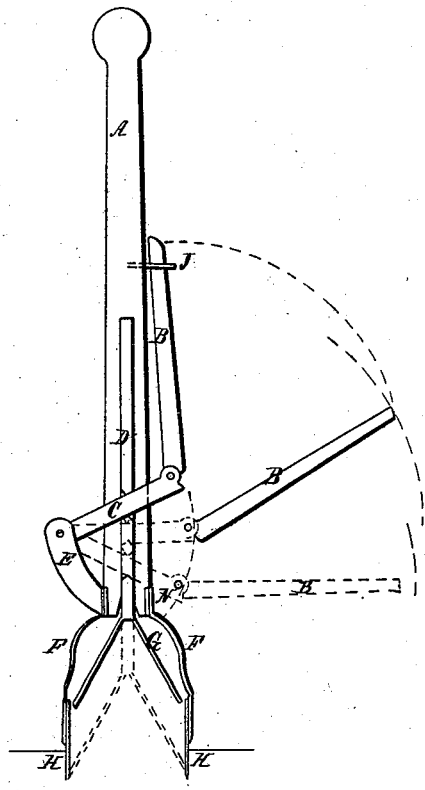

Figure 1 is a perspective view of my machine.
Figure 2 is a vertical section, showing the operation of the plunger and levers.
In drawing, same letters refer to same parts.

General Description.

A is the handle or shaft of the machine.
B is a lever, attached by an elbow-joint to the lever C, to operate the plunger G.
D is the arm of the plunger, working in the handle A.
E is an arm, to hold the end of the lever C.
F F F are spring-arms, to hold the spades.
G is the cone-shaped plunger.
H H H are the spades.
J, a pin to attach the lever B to when raised up.
K K shows the slits or openings between the spades.
N, the ring or socket on the end of the handle or shaft A. To this socket is attached the arms F F F.

Construction and Operation.

I construct the spades of any suitable material, usually of steel, but in large machines I use chilled cast-iron. The other parts I make of any material that will answer the purpose.

To operate the machine, if a small one, grasp the handle or shaft A, and raise the machine in a perpendicular manner and let it descend upon the earth; its weight will force the spades into the ground.

The lower or cutting-edge of the spades are beveled from the inside, and as the spades enter the ground the earth is compressed within the spades, the arms of the spades springing out as the earth is forced in, and the air in the cone-shaped plunger is compressed within the cone. Then raise the machine and move it to the place where the earth is wanted, take the lever B from pin J and move it out, as indicated by dotted lines in fig. 2, it acting on lever C by means of the elbow-joint, and as it is forced down the plunger G is forced down, carrying with it the earth held in place by the spades. Now by raising the lever B to the pin J again, the plunger G is raised up in place to use the machine again.

The compressed air in the cone-shaped plunger aids in forcing the earth out.

I design this machine to be made any size desired. When used for wells, or when large bodies of earth are to be moved, I use horse or steam-power to raise and lower the machine.

The plunger G is made to fit the curve of the spades, and acts as a scraper, to keep the same clean. When large machines are used I put on two spring-arms to each spade to give greater strength, enabling the machine to retain larger quantities of earth.

Claim.

The combination, in the manner herein set forth, of the central plunger G, with the inclosing spades H H H, and with the levers E C B, for operating the same.

JOHN W. MYERS.

Witnesses:
W. W. SANBORN,
WM. H. GIBBS.